United States Patent [19]

Richardson et al.

[11] Patent Number: 4,819,615
[45] Date of Patent: Apr. 11, 1989

[54] PIGGY BACK EVAPORATOR FOR MAPLE SYRUP EVAPORATOR APPARATUS OR THE LIKE

[76] Inventors: Gordon L. Richardson; James G. Richardson, both of Woodstock, Vt. 05091

[21] Appl. No.: 55,225

[22] Filed: May 29, 1987

[51] Int. Cl.[4] ............................ B01D 1/26; C13F 1/00
[52] U.S. Cl. .......................................... 127/9; 127/16; 159/18; 159/20.1; 159/29; 159/23; 202/185.3
[58] Field of Search .............. 127/16, 9; 159/18, 20.1, 159/29, 23; 202/185.3

[56] References Cited

U.S. PATENT DOCUMENTS

| | | |
|---|---|---|
| 643,794 | 2/1900 | Harvey . |
| 699,038 | 4/1902 | Thoens . |
| 1,172,133 | 2/1916 | Grevemberg . |
| 2,377,634 | 6/1945 | Kidd . |
| 2,999,795 | 9/1961 | Sakae Yagi et al. ................... 159/18 |
| 3,481,835 | 12/1969 | Carnavos . |
| 3,551,298 | 12/1970 | Lichtenstein ......................... 159/18 |
| 3,820,581 | 6/1974 | Machida et al. . |
| 3,875,988 | 4/1975 | Machida et al. . |
| 4,152,196 | 5/1979 | Buhlmann . |
| 4,200,600 | 4/1980 | Myreen . |
| 4,290,818 | 9/1981 | Huber et al. . |

Primary Examiner—H. M. Sneed
Assistant Examiner—Chung K. Pak

Attorney, Agent, or Firm—Sughrue, Mion, Zinn, Macpeak & Seas

[57] ABSTRACT

A piggy back evaporator is sealably coupled in open box form overlying a sugar maple sap evaporator and aligned with an upright flue pan of the conventional sugar maple sap evaporator which, when fired, boils off vaporizable constituents of the sap. The piggy back evaporator includes a drip pan sealably mounted to the flue pan. The drip pan includes an oblique condensate drain sheet extending over the major length of the same. A steam hole within the condensate drain sheet allows steam to reach the lower surface of a bottom wall of a piggy back pan. The piggy back pan bottom wall is corrugated to define a series of laterally spaced troughs on its upper face and flues on its lower face. A hood overlies the piggy back pan and seals off the interior thereof. A high pressure air blower is mounted to the hood and feeds air under pressure into a plenum chamber and downwardly through downpipes into individual horizontal sparging tubes which extend the length of the piggy back pan and are located within the bottoms of individual troughs defined by the corrugations. Air under pressure passes through pin holes within the sparging tubes with the bubbles formed thereby scouring the metal surfaces of the troughs within the piggy back bottom wall and additionally creating an effective frothing action for the sap within the piggy back pan.

5 Claims, 4 Drawing Sheets

4,819,615

PIGGY BACK EVAPORATOR FOR MAPLE SYRUP EVAPORATOR APPARATUS OR THE LIKE

FIELD OF THE INVENTION

This invention relates to a maple syrup evaporator apparatus and more particularly to a piggy back evaporator which may be added to the apparatus to increase evaporation through the utilization of waste heat.

BACKGROUND OF THE INVENTION

In concentrating maple syrup, it is necessary to boil off the water which forms a high percentage of the liquid content of the maple sap thereby concentrating the maple syrup by subjecting the sap as removed from the maple tree to heat, and permitting the water vapor to be driven therefrom. Typically, the maple sap is fed into an upwardly open flue pan supported over a wood or coal fire and collecting the concentrated maple syrup which fails to be driven off by the vaporization process. Such known maple syrup evaporator apparatus is relatively ineffective. There is considerable waste heat generated and the steam driven off by the process of heat application to the sap filling the standard flue pan to a given level is simply lost.

It is therefore a primary object of the present invention to provide a piggy back evaporator physically mounted in overlying position to a evaporator flue pan, to feed maple sap to both the flue pan and a piggy back pan, to utilize the heat within the steam generated by vaporization of the water content of the maple sap within the flue pan as the source of heat for the piggy back pan while, simultaneously increasing the heat exchange between the steam and the sap born by the piggy back pan.

DESCRIPTION OF THE PREFERRED EMBODIMENT

Figure 1:
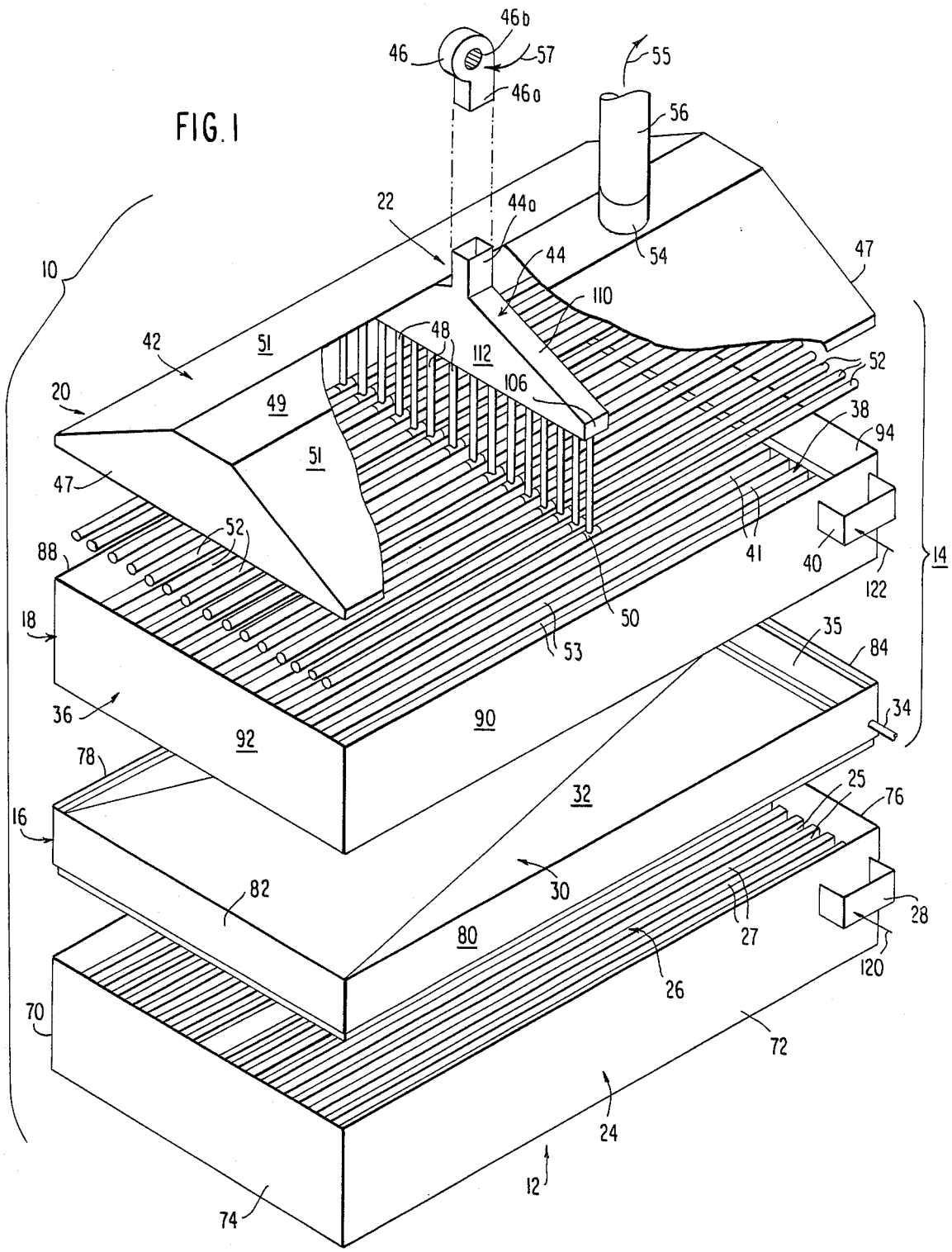
FIG. 1 is a schematic, exploded, perspective view, partially broken away of the piggy back evaporator forming a preferred embodiment of the invention as applied to a standard flue pan of an existing maple syrup evaporator apparatus.

Referring to the drawings, the piggy back evaporator of the present invention has particular application as an attachment or addition to a maple syrup evaporator apparatus, indicated generally at 12, and forming an assembly 10 whose principle component is the piggy back evaporator indicated generally at 14. The components of assembly 10 are shown in an exploded view, partially broken away, to facilitate and understanding an appreciation of the claimed invention. In terms of a maple syrup evaporator apparatus 12, such evaporator apparatus includes a flue pan indicated generally at 24 which is of rectangular box form, is upwardly open and is provided internally with a corrugated bottom wall 26 forming a plurality of parallel, longitudinally extending upwardly open troughs 25 between laterally spaced vertically upright walls 27, within which troughs maple syrup sap S is boiled. Such flue pan includes a flue pan regulator indicated at 28 for controlling feeding of a supply of maple sap (as collected from a sugar maple tree) to the interior of the flue pan 24. The sap S is subjected to heat from a fire positioned beneath the corrugated bottom wall 26 of flue pan 24 within a fire box 29 which fire readily heats the vertical walls 27 of the corrugated bottom wall 26. Such structure is conceded to be standard in the art.

The invention is directed to the piggy back evaporator indicated generally at 14 as a separate evaporator, or in combination with a maple syrup evaporator 12 utilizing a flue pan such as that shown at 24 FIG. 1 and being physically mounted thereto, in overlying position thereon.

Figure 2:
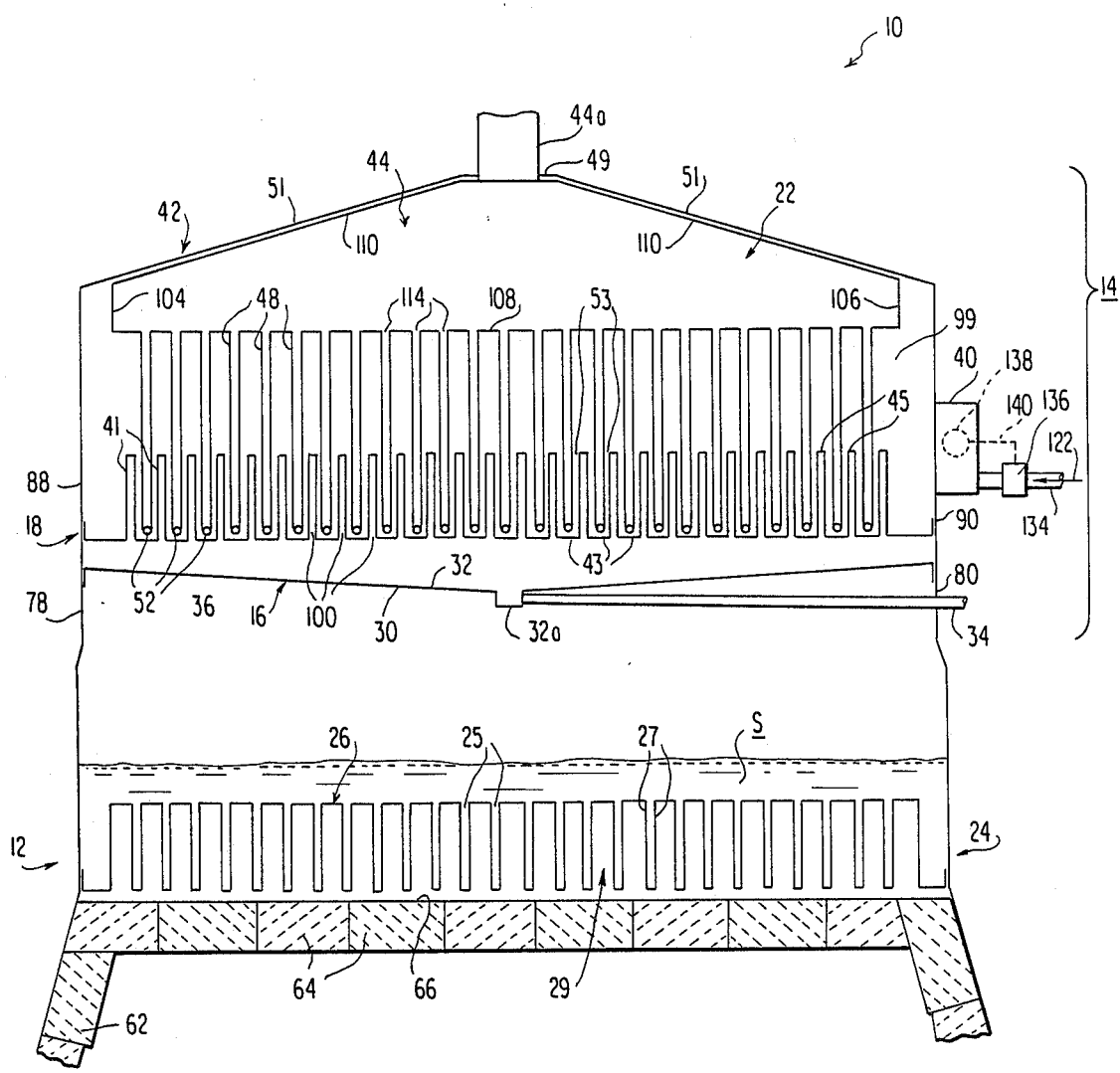
FIG. 2 is a schematic transverse sectional view of the apparatus of FIG. 3 as mounted on a fire box and taken about line II-III thereof.

In that respect, the piggy back evaporator 14 FIGS. 1 and 2 consists of several main components; a drip pan assembly indicated generally at 16, a piggy back pan indicated generally at 18; a hood indicated generally at 20, and a plenum assembly indicated generally at 22, FIG. 1. The drip pan assembly 16 includes a drip pan 30 of open, rectangular, sheet metal form and is sized to that of the standard flue pan. Assembly 16 overlies the flue pan 24. The drip pan 30 includes, integrally, an oblique, condensate collector sheet 32 which inclines downwardly at a slight angle from one longitudinal end wall 82 of pan 30 and terminates short of the opposite end to thereby form a transverse opening 35 across an end of the drip pan assembly 16 from one lateral side to the other to thereby permit steam 152, FIG. 3 resulting from boiling out of the water content of sap S within the interior of the flue pan 24, to rise upwardly from the boiling sap S and to contact the lower surface 37 of the bottom wall 39 of the piggy back pan indicated generally at 36, and forming a major component of the piggy back pan assembly indicated generally at 18. The oblique drip pan condensate collection sheet 32 is provided with a transverse trough 32a, FIG. 2, at its lower end adjacent opening 35, within which is positioned a tube 34 constituting the condensation outlet for the drip pan assembly 16. That outlet extends laterally to the side of the drip pan 30.

Figure 3:
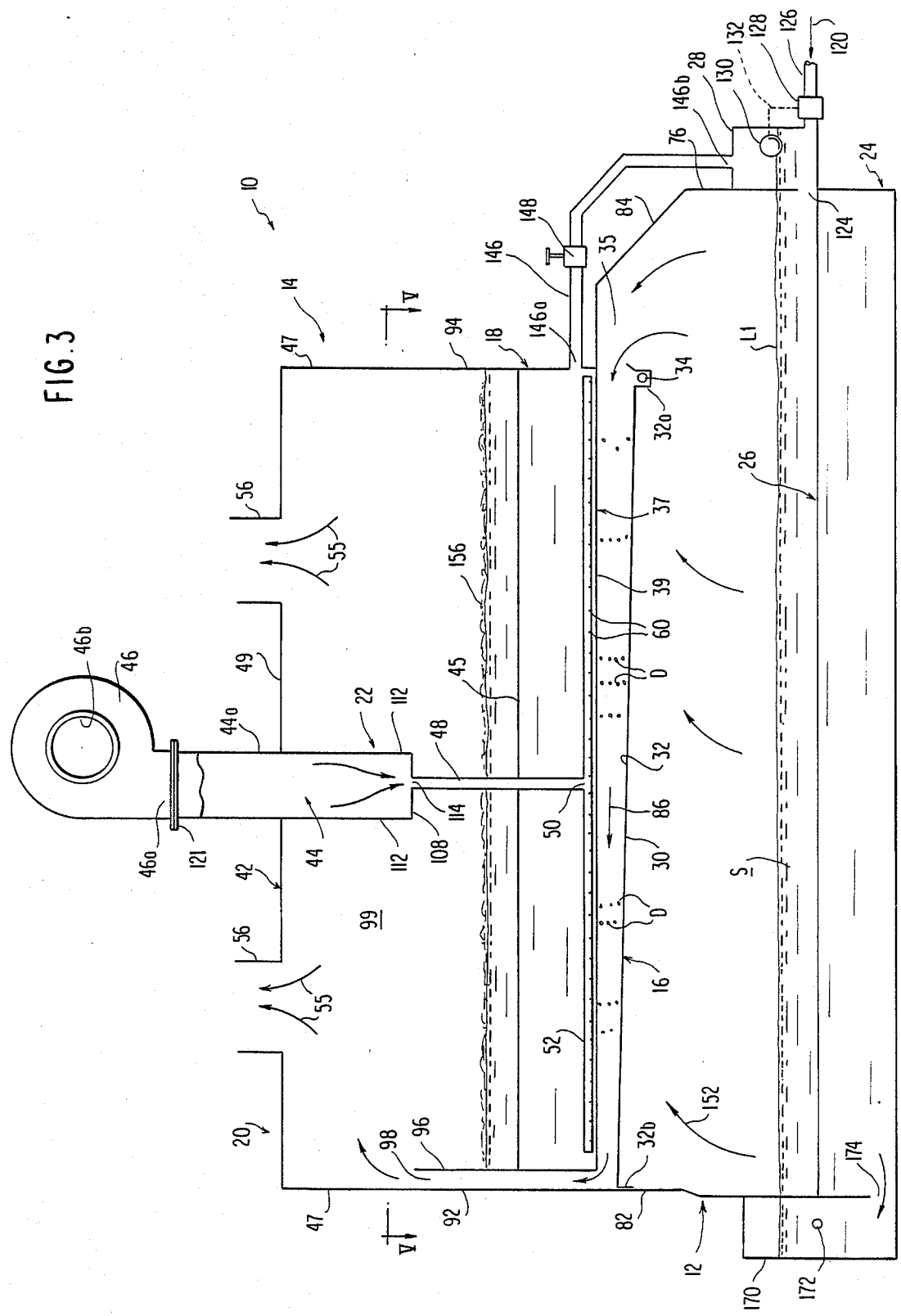
FIG. 3 is a schematic, longitudinal sectional view of the apparatus of FIG. 1.

The second major component of the piggy back evaporation 14, FIGS. 1, 2 and 3, is the piggy back pan assembly 18. The piggy back pan 36 of that assembly is of upwardly, open, rectangular form, being manufactured of sheet metal as are most of the ocmponents of the piggy back evaporator including drip pan 30 and flue pan 24. Further, the bottom wall 38 of the piggy back pan 36 is of side to side rectangular convoluted form including vertical, laterally spaced side wall portions 41 forming laterally spaced, horizontal bottom wall portions 43, and horizontal top wall portions 45 forming flues 100 on the exterior, and vertical troughs 53 on the interior of the piggyback pan.

A hood 42 FIG. 1, is sized to the piggy back pan 36, overlies and is sealed thereto, and includes opposite end portions 47, a central, flat top wall portion 49, and oblique top wall portions 51 extending outwardly and downwardly from central top wall portion 49 to opposite sides thereof. These portions may all be formed of sheet metal and welded together along confronting edges.

Figure 4:
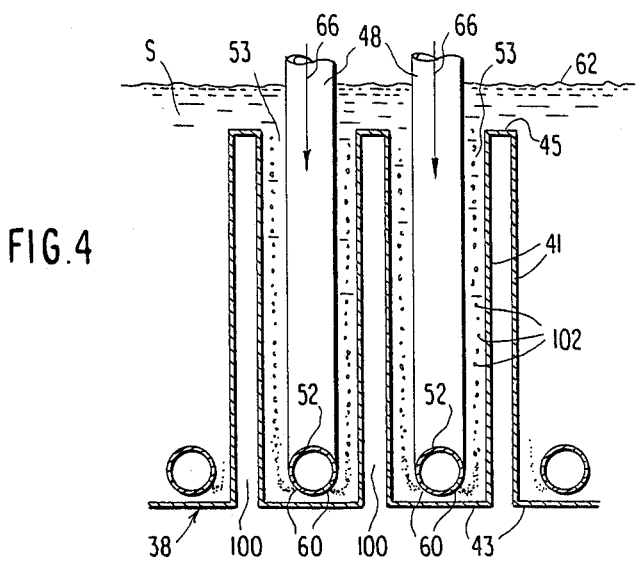
FIG. 4 is an enlarged, schematic view of a portion of the piggy back evaporator of FIG. 2 as shown within the area designated by the broken lines and identified by the arrow labeled detail IV.

Physically mounted to the hood 42 is the plenum assembly 22. A high pressure blower 46 includes a rectangular air discharge duct 46a which fits to a plenum chamber supply duct 44a of a plenum chamber 44. Plenum chamber 44 is configured to hood 42 and extends laterally from side to side but centered longitudinally within assembly 10. A series of downpipes 48 open at their upper ends to the interior of plenum chamber 44, are fixed thereto at one end, and are coupled by T couplings at their opposite ends to respective ones of a plurality of sparging tubes 52 which extend the full length of piggy back pan 36. Sparging tubes 52, FIG. 4, are insertably received within troughs 53 defined by the laterally spaced vertical side walls 41 of the piggy back pan bottom wall 38. The sparging tubes 52 are provided with holes at 60 at or near the bottom of those tubes to facilitate the discharge of air under pressure into the troughs 53 for air perculation through the sap S which fills the piggy back pan 36 to a level which is preferably above the horizontal top wall portions 45 of the piggy back pan corrugated bottom wall 38 of pan 30.

Further as seen in FIG. 1, the horizontal hood center wall 49 is provided with a pair of vertically upright steam outlet pipes or steam exhaust chimneys 56 (only one of which is shown) which extend upwardly from cylindrical collars 54 integrated to the hood horizontal top wall 49. Steam as indicated by arrow 55, FIG. 1, escapes from the hood 42. Additionally, air as indicated by arrow 57 is sucked into the high pressure blower 46, through air inlet 46b with the blower operating, so as to feed air under pressure to the sparging tubes 52 for discharge beneath the level of maple sap S fed to and maintained within the piggy back pan 36 as evidenced in FIGS. 3 and 4.

The details of the piggy back evaporator 14 and its integration to the flue pan 24 of a maple syrup evaporator 12 to thereby form the apparatus 10, FIG. 1, may be further appreciated by reference to FIGS. 2–5, inclusive, taken in conjunction with the detailed description of the apparatus and its nature of its operation, hereinafter.

In that respect, fire brick at 62, FIG. 2 in vertically upright fashion along with additional fire brick 64 define, with the standard flue pan 24, a portion of a standard maple syrup evaporator indicated generally at 12. A coal or wood fire may be maintained on the upper surface 66 of the fire brick structure and within fire box 29. The standard flue pan 24 consists of a metal box and, in addition to the bottom wall 24, is formed by laterally opposed side walls 70, 72 and longitudinally opposed end walls 74, 76. While the flue pan 24 is open at the top, it is physically closed by the condensate drain sheet 32 of the overlying drip pan 30 of drip pan assembly 16. In that respect, the drip pan 30 is also of rectangular box form including laterally opposed side walls 78, 80, FIG. 2 and longitudinally opposed end walls 82, 84, FIG. 1.

The condensate drain plate 32, FIG. 3, has one end 32b welded to the end wall 82 of the drip pan while its opposite end is bent into a U-shaped trough at 32a so as to collect the condensate running down over the upper surface of the condensate drain sheet 32. The gap or space 35 between trough 32a and end wall 84 of the drip pan, allows the steam to escape from the boiling sap S to contact the bottom surface 37 of the piggy back pan bottom wall 38, FIG. 3, so that the steam can condense thereon. The condensate falls, as indicated by droplets D, onto sheet 32 as the steam flows as indicated by arrows 86 toward the enclosure above the piggy back pan 36.

In addition to the piggy back pan bottom wall 38, piggy back pan 36 is formed by laterally opposed side walls 88, 90 and longitudinally opposed end walls 92, 94 FIGS. 2, 3. Further, a vertical partition wall 96 separates end wall 92 from the piggy back pan bottom wall 38 to define a vertical vent passage or steam escape passage 98 allowing non-condensed steam to enter chamber 99 defined by the piggy back pan 36 and hood 42. The corrugated bottom wall 38 undulates transversely across the piggy back pan 36 from one lateral side wall 88 to the other lateral side wall 90, forming a series of parallel vertical walls 41, flat horizontal top wall portions 45 and flat bottom wall portions 43, thus, defining sap carrying troughs 53 internally of the piggy back pan, and steam condensing flues 100 between respective opposed vertical wall portions 41 open to the steam, passing as indicated by arrows 86, between the top surface of the condensate drain plate 32 and the bottom wall 38 of the piggy back pan 36.

The metal sparging tubes 52 FIG. 4, which have their opposite ends blocked off and are disposed, respectively within the sap troughs 53 of the piggy back pan assembly 18, adjacent the flat bottom wall portions 43 partially defining those troughs. A series of longitudinally spaced small diameter holes 60 within those tubes, in proximity to the bottom wall portions 35, allow escape of air under pressure, such that compressed air bubbles 102, FIG. 4 are formed which pass upwardly through the sap S accumulating within troughs 51. Air as per arrow 57, FIG. 1 and by arrows 66, FIG. 4 passes downwardly through the downpipes 48 emanating from plenum chamber 44. Plenum chamber 44 FIGS. 1, 2, is formed by laterally opposed end walls 104, 106, a horizontal bottom wall 108 a pair of oblique top wall portions 110 leading to vertical duct 44a and laterally opposed side walls 112. Plenum bottom wall 108 includes a series of drilled holes as 114. Holes 114 receive the upper ends of downpipes 48, which are welded to plenum chamber bottom wall 108. The downpipes open internally to the interior of the plenum chamber 44 at that end. The opposite ends of the downpipes 48 are welded or soldered to T-fittings 50 and the fittings 50 are welded or soldered to the horizontal sparging tubes 52. In FIG. 3, the upper end of the plenum chamber vertical duct 44a is joined to the lower end of the high pressure blower air discharge duct 46a by a flanged connection 121, FIG. 3. The blower air inlet at 46b acts to supply air as indicated by arrows 66, FIGS. 2, 3, through the downpipes 48 to respective sparging tubes 52.

The control and operational details of the standard maple syrup evaporator 12 and the piggy back evaporator 14 supported thereby and integrated thereto will now be described. In the schematic views of FIGS. 1–5, inclusive, the drawings have been purposely distorted to show the operative arrangement of the flue pan regulators and the piggy sap regulator and to stress the nature in which a flow of sap S from the piggy back pan, is metered into the boiling sap S within the standard flue pan 24 at the flue pan regulator 28. In that respect, FIG. 1 shows the piggy back sap regulator 40 mounted to the piggy pan pan side wall 80 and the flue pan regulator 28 mounted to the evaporator flue pan side wall 72. For illustration purposes, in FIG. 3, schematically, the flue pan regulator 28 is shown at end wall 76 so that a second flow of concentrated sap S from the piggy back pan 36 is metered into the main flow of boiling sap S within flue pan 24. In assembly 10, as indicated by arrow 120, a metered flow of raw maple sap is fed to the standard flue pan 24 as indicated by arrow 120. A second separate feed of maple sap is fed as indicated by arrow 122, FIG. 1, to the piggy back pan 36 via piggy back sap regulator 40. That flow is also shown schematically in FIG. 2 by the same arrow 122.

The flue pan regulator 28 is of sheet metal, of rectangular box form, integrated to the wall 76 of the flue pan, with an opening 124 within such wall 76, FIG. 3. A feed pipe 126 connects to a storage tank of maple sap (not shown). The pipe 126 includes a float operated valve 128. Float 130, thereof, is physically mounted within the flue pan regulator 28 and is connected mechanically by linkage 132 to valve 128 so as to maintain a level $L_1$ of the boiling sap S within the flue pan 24. Since the water content of the sap continues to boil off thus thickening the sap S remaining within the flue pan 24 as the level drops, the float 130 automatically opens the valve to permit fresh sap as indicated by arrow 120, FIG. 3 to enter the flue pan regulator 28 and via opening 124 into the interior of the standard flue pan 24.

A similar arrangement is used for the piggy back evaporator 14. As best seen in FIG. 2, the piggy back sap regulator 40 is a rectangular box-like structure mounted to lateral side wall 90 of the piggy back pan 36. A pipe 134 connects to the piggy back sap regulator 40 at the bottom thereof and includes a float operated valve 136 which is connected to float 138 via mechanical linkage 140 such that as the float rises, the valve 136 is automatically shut off.

Both regulators 28, 40 operate under the same principle to maintain appropriate levels of sap S within respective pans 24, 36. The discharge of fresh sap entering the piggy back sap regulator 40 as per arrow 122, is seen in schematic FIG. 5. A distribution tube or pipe 142 extends through the piggy pan side wall 90, opens to the interior of the float regulator 40 and has its discharge end 142a overlying the convoluted bottom wall 38 of the piggy back pan 36, near the center, and adjacent end wall 94 of the piggy back pan 36.

Figure 5:
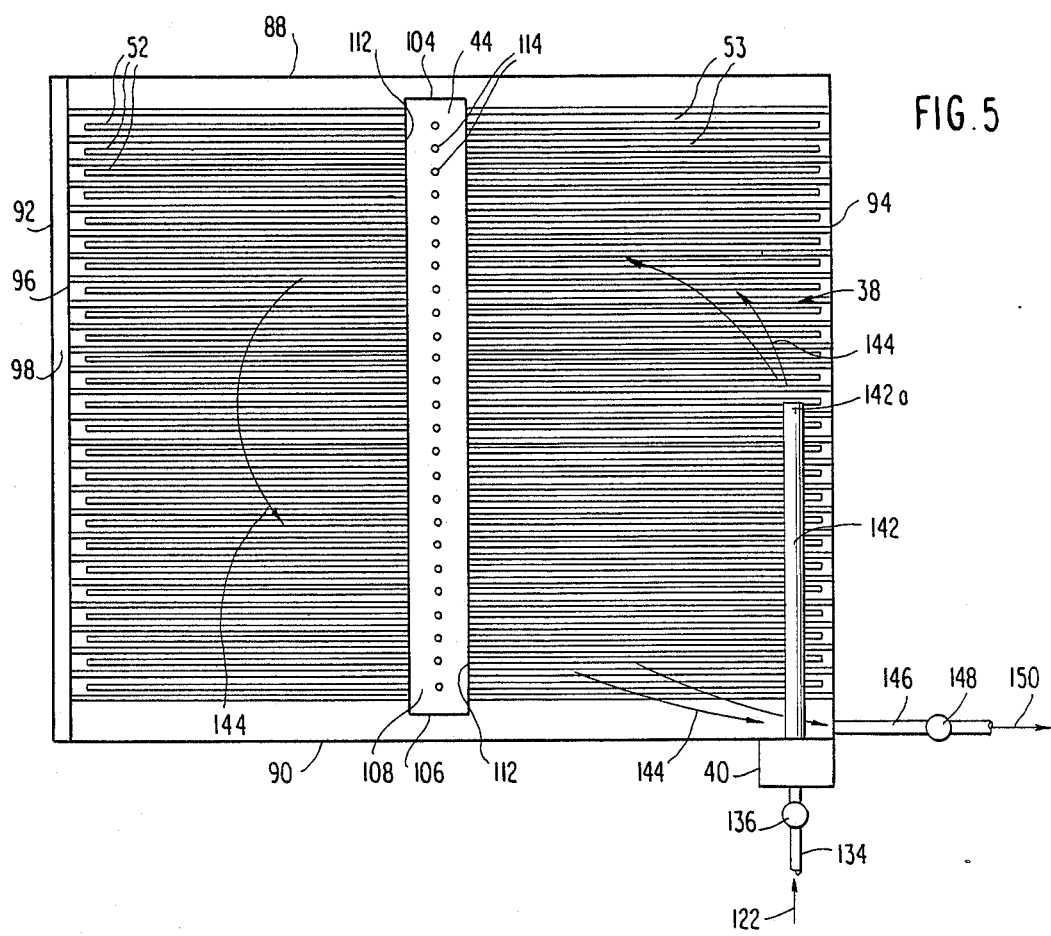
FIG. 5 is a schematic horizontal sectional view of FIG. 3, taken about line V—V of FIG. 3.

The circulation of the sap through the piggy back pan is in loop form as indicated by arrows 144, Figure 5. As may be appreciated, the various troughs 53 are open to the upstream end 146a of a drawoff pipe or tube 146, the pipe 146 being at a level corresponding to the bottom of the troughs 53, FIG. 3.

As seen in FIGS. 3 and 5, the drawoff pipe 146 includes a manually operated outlet valve 148 which controls the rate of concentrated sap being drawn off the piggy back evaporator 18 and being fed to the main mass of boiling sap S within the flue pan 24. As seen in FIG. 3, the drawoff pipe 146 terminates with its end 146b remote from the piggy back pan 36 opening into the flue pan regulator 28. In the schematic representation, that end, 146b opens into the top of the flue pan regulator 28 and discharges therein a metered flow of concentrated sap S from the piggy back evaporator as indicated by arrows 150. As may be appreciated, a constant rate of concentrated sap from the piggy back evaporator is fed into the interior of the flue pan 24 while simultaneously fresh sap 120 is also metered by the float valve 128.

The piggy back evaporator 14 while preferably designed as an apparatus to be added to a maple syrup evaporator to increase evaporation to the utilization of waste heat, is not limited to maple syrup production. Reference to the liquid in the flue pan and the piggy back pan as maple sap is intended to be non-limiting. The sap of the sugar maple forming streams 120, 122 to respective pans 24, 36 is illustrative of a liquid which is being concentrated by the dual evaporation processes occurring within respective pans 24, 36. As such, the sap as streams 120, 122 enter pans 24, 36 through float regulators 28, 40 respectively. Concentrated sap is drawn off of the piggy back pan 36 through the manually regulated valve 148, fed to the underlying flue pan 24 as indicated at 150, FIG. 3. Highly concentrated sap S is drawn off the standard flue pan 24, via drawoff pipe 172, FIG. 3.

With a wood fire or coal fire within the fire box 29 above fire brick 64, FIG. 2, the sap S within the standard flue pan 24 boils, creating steam consisting principally of the water boiled off the sap to concentrate the sap and form syrup within the flue pan 24. The steam as indicated by arrows 152, FIG. 3 moves into the space 154 between the condensate drain sheet 32 and the convoluted bottom wall 38 of the piggy back pan 36. Here nearly all the steam condenses as it comes into contact with the cooler surface of the piggy back pan 36. Any steam that does not condense, may escape through vent 98 into the chamber 99 defined by the hood 42 and the piggy back pan 36 as shown by arrows 86. The steam is exhausted through the paired steam outlet ducts or collars 54 within the flat central wall of hood 42, connected to respective chimneys 56.

The steam condensate, collected by the drip pan 16 at the lower end of the condensate drain sheet 32 via trough 32a, is removed transversely through condensate drain pipe 34 which projects through side wall 80 of the drip pan, FIG. 1. This condensate as hot water, may be passed through a standard heat exchanger (not shown) which is preferably used to preheat the incoming sap 120, 122.

A key aspect of the invention involves the use of the blower 46 and the plenum 44 of plenum assembly 22. Air, as per arrow 57, FIG. 1, is drawn into the blower 46 through air inlet 46b by energizing an electric motor (not shown) coupled to a blower rotor (not shown). The pressurized air is forced through the plenum chamber 44 as shown by arrows 66, FIG. 3 and through the downpipes 48 to the respective horizontal sparging tubes 52 which lie at the bottoms of the troughs 51. The sparging tubes 52 meter and deliver the air, as bubbles 102, evenly through many holes 60 at the lowest point in the troughs 53 throughout the piggy back pan 36. By setting the speed of the drive motor for the blower 46, an appropriate air volume and differential pressure may be created between the plenum chamber and the steam exhaust chimney 56 connected to the steam exhaust duct 54 at the top of hood 42 and rising upwardly therefrom. This results in a vigorous, evenly distributed frothing action 156, FIGS. 3, 4 to the sap S. Further, as seen in FIG. 4, during operation of the blower 46, the sap and air mixture raises the sap level as illustrated at 62, FIG. 4 above the normal sap level 64. With the blower on, the sap level 62 is above the troughs 53 and correspondingly the level of the flues 100 between those troughs and to the outside of the piggy back pan 36. The air as indicated by bubbles 102, FIG. 4, in passing through the sap S within the troughs 51 causes agitation of the sap and scouring of the metal wall 41 surfaces, greatly increasing the transfer of heat in the condensing steam 86 to the sap S interiorly of the piggy back pan evaporator.

The air becomes heated and saturated with moisture as it passes through the sap. Resulting evaporation consumes the heat, thus creating the temperature differential between the sap air mixture (froth) 156 and the condensing steam D beneath the piggy back pan 36.

The piggy back evaporator 14 functions to produce a secondary steam and air mixture. By covering the piggy back pan 36 with hood 42, a chamber 99 above the piggy back pan 36 is created which contains a steam and air mixture. The exhaust chimneys 56 are of suitable diameter and vertical length (height) to create an updraft sufficient to evacuate the air/steam mixture within the hood as indicated by arrows 55, FIG. 1. Additionally, the hood 42 contains any splashing which may occur to direct the liquid content back into the upwardly open piggy back pan 36.

The concentrate within the piggy back pan 36 is drawn off in a continuous flow, regulated by a manual valve 148 with the valve setting being readily varied. A larger flow provides a lower concentrate of sap (or other liquid being concentrated by vapor boil off of a constituent part thereof), while a smaller flow results in a higher concentrate. The concentrate is transferred via drawoff pipe 146 to the open regulator box 28 of the standard evaporator 12 mounted below the piggy back evaporator and becomes part of the sap S subjected to boiling in that evaporator 12.

As may be appreciated from the above, the piggy back evaporator 14 can be readily mounted to a maple syrup evaporator 12 as a piggy back unit and operates effectively based on the waste heat of the steam from the standard flue pan and requires minimal additional energy, limited to the high pressure air blower. The evaporator capacity may be increased by a factor of approximately 65%, requiring additional piping limited to the supply of raw sap S from a storage tank via second float operated regulator.

The operating steps are simple requiring in sequence the filling of the pans to operating levels with sap S on the order of 6 to 7 inches deep and overlying the top of the flues. The inlet valve or valves are turned off. When the evaporators are up the temperature the high pressure blower is energized. The inlet valve is then opened to the piggy back evaporator, and the outlet valve 136 is opened to provide a thin pencil stream of concentrate which feeds to the underlying flue pan 24. The float regulator 40 for the piggy back pan 36 is adjusted to maintain the proper depth of sap S therein. the depth of the sap S in the piggy back pan 36 directly affects the static pressure in the air plenum chamber 44 and the output of the blower 46. The piggy back evaporator, as illustrated, operates at a temperature of approximately 175° F.

In termination of the piggy back evaporator, the air blower 46 is turned off first and the outlet valve 148 is opened to allow the sap to drain out of the piggy back pan 36 into the underlying flue pan 24. Finally, access doors (not shown) in the hood 42 are opened to allow the steam to escape. The standard maple syrup evaporator apparatus 12, as per FIG. 3, requires the controlled flow removal of concentrate. A separate concentrate drawoff chamber 170 is illustrated in FIG. 3 to the outside of end wall 74 of the flue pan 74 and connects to a drawoff pipe 172 leading to suitable maple syrup storage tank (not shown). A hole 174 within the bottom of that wall opens to the bottom of the troughs 25 within the bottom wall 26 of the flue pan 24 to permit the concentrate to be selectively removed in a continuous manner. A valve similar to valve 148 within pipe 146 may be employed for setting the controlled rate drawoff of the concentrate from the standard flue pan via pipe 172.

While an example of the present invention as a preferred embodiment is illustrated schematically, those skilled in the art will recognize the various changes in the disclosed structure and exemplary methods of operation can be made without the parting from the spirit scope of the invention.

What is claimed is:

1. A piggy back evaporator coupled in stacked overlying position to a syrup evaporator apparatus including an upright box flue pan carrying syrup for evaporation subject to an underlying fire to boil off vaporazable constituents thereof, said piggy back evaporator comprising:

a drip pan sized to the flue pan, mounted to the flue pan and overlying said flue pan, said drip pan including an oblique condensate drain sheet plate extending over the major length of the same, a steam hole within said condensate drain plate, a piggy back pan sized to and mounted to the top of the drip pan, said piggy back pan being upwardly open and including a corrugated bottom wall defining a series of laterally spaced troughs therein interiorly of the piggy back pan and a series of vertical flues on the exterior of the piggy back pan bottom wall facing said drip pan, a hood covering an open top of said piggy back pan, being sealed about edges thereof to said piggy back pan, said drip pan, said piggy back pan and said hood comprising a vertically stacked assembly, at least one steam exhaust chimney carried by said hood and extending upwardly therefrom, a plenum assembly mounted to said hood, said plenum assembly including a high pressure air blower, an air inlet passing through said hood and connected to said blower, a plenum chamber internally of said hood and connected to said air inlet, said piggy back evaporator further comprising a plurality of downpipes projecting downwardly from said plenum chamber and opening to the interior of the plenum chamber and a plurality of sparging tubes extending the length of the piggy back pan and being connected to respective downpipes, said sparging tubes being located within the bottoms of said troughs, longitudinally spaced holes within said sparging tubes, means for feeding sap to the piggy back pan of the piggy back evaporator and the flue pan of the evaporator apparatus, means for drawing off concentrate from the piggy back pan and adding the drawnoff concentrate to the flue pan, and means for drawing off concentrate from the flue pan and wherein, the capacity of the blower, the number and size of the holes within said sparging tubes, the size of said at least one steam exhaust chimney and the vertical length of said at least one chimney are such that the steam from the flue pan is caused to condense on the bottom wall of the piggy back pan to effectively boil off the sap within the piggy back pan, and nearly all of the steam resulting from boiling off water content of the sap within the flue pan condenses on the undersurface of the piggy back pan due to the application of sparging air flow via said blower, said plenum chamber and said sparging tubes to the surface of the upper side of the piggy back pan, scouring the metal surfaces of the troughs within the piggy back pan bottom wall and creating an effective frothing action with the sap to form a sap and air mixture whereby the air in passing through the sap is effectively heated and saturated with moisture with the resulting evaporation of the moisture captured by the air consuming a large quantity of heat to maintain the temperature differential between the sap and air mixture and the condensing steam under the piggy back pan at a level to insure that almost all of the steam is condensed in the area between the drip pan and the piggy back pan to increase liquid concentration of the sap processed thereby.

2. The piggy back evaporator as claimed in claim 1 wherein the corrugated bottom wall of said piggy back pan is horizontally disposed, said oblique, condensate drain sheet defines with said horizontal corrugated bottom wall a space which narrows away from the opening within said condensate drain sheet toward the opposite end of said drip pan, wherein a vertical partition extends upwardly from said piggy back pan bottom wall adjacent to the end wall of the piggy back pan remote from the hole within the condensate drain sheet to form a vertical steam vent passage open at the bottom to said space between the bottom wall of the piggy back pan and the top of the oblique condensate drain sheet and opening at the top into a chamber defined by said piggy back pan and said hood to facilitate the removal of uncondensed steam via said at least one chimney.

3. The piggy back evaporator as claimed in claim 1 wherein, said flue pan includes a float regulator mounted on a vertical wall of the flue pan, and opening within said vertical wall connecting the interior of the flue pan to the interior of the float regulator, and wherein said means for feeding sap to respective pans comprises a sap feed pipe opening to the float regulator, and a float controlled valve within said feed pipe whereby, fresh sap enters the float regulator and then passes through said opening within said vertical wall to the interior of said flue pan and wherein, said piggy back evaporator further comprises a drain off pipe opening to the interior of the piggy back pan at a level just above the bottom of said troughs and being connected at an opposite end to said float regulator and wherein, said drain off pipe includes a variably adjustable outlet valve for metering the removal of concentrate from said piggy back pan for delivery through said float regulator to said flue pan, whereby said float operated control valve of said float regulator is sensitive both to the level of fresh sap within the flue pan and the concentrate drawn off from the piggy back pan.

4. The piggy back evaporator as claimed in claim 2, wherein, said flue pan includes a float regulator mounted on a vertical wall of the flue pan, an opening is provided within said vertical wall connecting the interior of the flue pan to the interior of the float regulator, and wherein said means for feeding sap to respective pans comprises a sap feed pipe opening to the float regulator, and a float controlled valve within said feed pipe whereby fresh sap enters the float regulator and then through said opening within said vertical wall to the interior of said flue pan and wherein, said piggy back evaporator further comprises a drain off pipe opening to the interior of the piggy back pan at a level just above the bottom of said troughs and being connected at an opposite end to said float regulator and wherein, said drain off pipe includes a variably adjustable outlet valve for metering the removal of concentrate from said piggy back pan for delivery through said float regulator to said flue pan, whereby said float operated control valve of said float regulator is sensitive both to the level of fresh sap within the flue pan, and the concentrate drawn down from the piggy back pan.

5. The piggy back evaporator as claimed in claim 2 wherein, said drip pan oblique condensate drain sheet terminates at an end remote from said vertical vent passage in an integral trough, said trough of said drain sheet is longitudinally spaced from the end wall of said drip pan to thereby form said opening within said condensate drain sheet to permit steam to escape into said space between said condensate drain sheet and the bottom wall of said piggy back pan, and wherein, a condensate drain pipe projects through a side wall of said drip pan and connects at one end to said trough for removing condensate accumulating within said trough at the end of said drain sheet.

* * * * *